United States Patent

[11] 3,599,076

[72] Inventors Carl Ingvar Boksjo;
Hans Stackegard, both of Ludvika, Sweden
[22] Filed Oct. 17, 1967
[45] Patented Aug. 10, 1971
[73] Assignee Allmanna Svenska Elektriska Aktiebolaget
Vasteras, Sweden
[32] Priority Oct. 17, 1966
[33] Sweden
[31] 140/41

[54] OVERLOAD PROTECTOR FOR SHORT-CIRCUITING STATIC CONVERTERS IN RESPONSE TO INCREASES IN THE DIRECT CURRENT
3 Claims, 1 Drawing Fig.

[52] U.S. Cl. ........................................................ , 321/27
[51] Int. Cl. ...................................................... H02m 1/18, H02h 7/12
[50] Field of Search .......................................... 321/11, 14, 27

[56] References Cited
UNITED STATES PATENTS
2,969,495  1/1961  Mosh et al. .................... 321/14
FOREIGN PATENTS
148,844   0/1962  U.S.S.R. ......................... 321/27
775,620   5/1957  Great Britain ................. 321/27
1,085,602 6/1960  Germany ........................ 321/11

Primary Examiner—William H. Beha
Attorney—Jennings Bailey, Jr.

ABSTRACT: A static converter is provided with short-circuiting means on both the DC and AC sides, and with means to operate the short-circuiting means and to disconnect the AC side upon an increase in the DC current above a predetermined value; the current sensitive device operates the short-circuiting means successively with low time derivatives of the direct current and simultaneously with higher time derivatives.

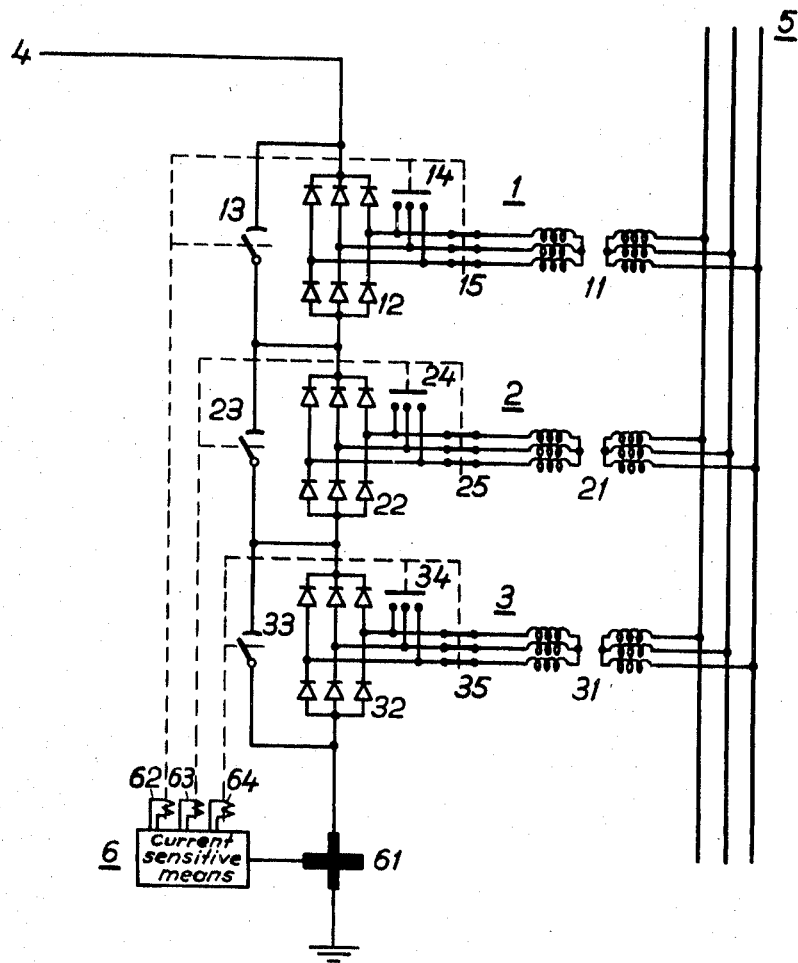

OVERLOAD PROTECTOR FOR SHORT-CIRCUITING STATIC CONVERTERS IN RESPONSE TO INCREASES IN THE DIRECT CURRENT

BACKGROUND OF THE INVENTION

1. Field of the Invention

The present invention relates to an overload protector for a static converter, preferably for high voltage. The protector is or particular value for rectifiers built up with uncontrolled rectifiers and it can also be used for converters with controlled rectifiers.

2. The Prior Art

When a fault occurs in a DC power transmission plant with a rectifier and an inverter station having converters equipped with controlled rectifiers, the control equipment of these will automatically reduce the direct voltage of the rectifier station so that the line current is limited to the adjusted current value. Recently, however, it has been suggested to build up rectifier stations for power transmission plants using uncontrolled rectifiers, preferably semiconductor diodes, which provides considerable simplification of the rectifiers. Since there is no way of controlling on the rectifier side and since breaking a direct current causes serious problems and since also such semiconductor diodes are rather sensitive to overcurrents, even of short duration, the rectifier station must in this case be provided with some form of overload protector.

SUMMARY OF THE INVENTION

Such a protector is according to the invention designed so that it comprises a current-sensitive member arranged on the DC side of the converter and short-circuiting means on both the direct and the alternating current sides of the rectifier connection of the converter, which short-circuiting means are controlled by said current-sensitive member in such a way that they are closed upon a certain increase in direct current. According to the invention therefore when a fault arises the protector will simply disconnect the rectifiers of the converter and, although such a protector is principally of value with uncontrolled rectifiers, it can very well be used in static converters with controlled rectifiers and for both rectifiers and inverters, particularly with controlled semiconductor (metal) rectifiers.

The short-circuiting of the rectifier bridge of a converter involves short-circuiting the AC network connected to the converter so that the short-circuiting protector of this network and possibly also the voltage control will thus come into operation. However, since activation of the overload protector will in any case cause such a short circuit, there is no special reason to see that the short-circuiting protection of the alternating network operates. According to the invention, therefore, it is proposed to let the overload protector of the converter disconnect the short-circuited rectifier bridge from the alternating current side.

The current increase which is to activate the overload protector may either be a current increase to a certain level or a certain time derivative for the current. In a converter station having several series-connected converters these may suitably be provided with a common current-sensitive device. This should then suitably be designed for step by step disconnection of the converters one at a time. Disconnection of a converter in an inverter station for instance will give rise to a current surge on the D.C. side, but is is sufficient to disconnect one converter in the rectifier station in order to attain balance between the stations so that the overload protector becomes inoperative.

With less pronounced earth faults it is sufficient in certain cases to disconnect one or more of the converters in the rectifier to protect the remaining converters against dangerous overcurrents. Bearing this in mind the disconnection rate of the protector is suitably made proportional to the time derivative of the over current so that the converters will be disconnected rapidly if a serious fault arises. Possibly this may be carried so far that at time derivatives about a certain level, all converters will be immediately short-circuited.

BRIEF DESCRIPTION OF THE DRAWINGS

The invention will be more fully described with reference to the accompanying drawings in which FIG. 1 shows a converter station with a protector according to the invention.

DESCRIPTION OF THE PREFERRED EMBODIMENTS

FIG. 1 shows three converters 1—3, the direct current sides of which are series-connected between a direct current line 4 and earth. The converters are provided with converter transformers 11, 21 and 31 connected in parallel to an alternating current network 5.

The converters also include rectifier groups 12, 22 and 32, the direct current sides of which are parallel-connected with bypass connection means in the form of isolators 13, 23 and 33. On the alternating current side of the rectifier groups are arranged three-phase short-circuiting members 14, 24 and 34 and the converter transformers and rectifier groups are connected together by breakers 15, 25 and 35.

The station is provided with an overload protector 6, the input side of which comprises a measuring transductor 61, the control winding of which is connected in the main circuit between the converter 3 and earth. The overload protector 6 is simply a current-sensitive member which gives an output signal at a certain overcurrent, either a current increase to a certain level or a current increase with a certain time derivative, or possibly a combination of these two functions. Furthermore the current-sensitive member 6 is provided with an output for each of the three converters 1, 2 and 3, for example in the form of relays 62, 63, 64.

Each output in the current-sensitive member 6 is arranged upon an overcurrent to close the isolator 13 and the short-circuiting member 14 and open the breaker 15 and corresponding means in the other converters. Furthermore, as mentioned, these outputs are arranged to operate one at a time so that at smaller overcurrents, first one and then possibly another of the converters 1, 2 and 3 will be influenced for short-circuiting and disconnection of its rectifier group.

Thus if it is merely a question of a fault in a converter in another station connected to the line 4 and having the same number of converters as that shown, this will, if the station is a rectifier station, cause a considerable increase in the direct current in the line 4. Thus, the current-sensing member 6 will come into operation, thus disconnecting a first converter by short-circuiting its rectifier group and disconnecting it from the alternating current network. Thus the number of converters in the two stations will again be equal and the direct current will return to its normal value so that operation can be continued with reduced voltage.

When an earth fault arises out on the transmission line, it is probably not sufficient merely to disconnect a single converter in the rectifier station and in this case a subsequent converter will also have its rectifier group short-circuited and disconnected. If the fault is less pronounced, it is quite possible that the direct voltage will have been reduced so much that the direct current will fall to a permissible value so that the current sensitive device will go out of action.

When the fault is of a more serious nature, usually all the converters must be disconnected in order to avoid damage to their rectifiers and in such a case it is often desirable to make the disconnection rate dependent on the time derivatives of the current alterations so that the disconnection rate increases somewhat for the different converters. If there is an extremely serious earth fault in the rectifier station, it must be attended to very rapidly if the rectifiers are not to be destroyed and therefore at current derivatives above a certain level, the member 6 should as mentioned be arranged for simultaneous disconnection of all the converters so that the short-circuiting currents are limited as much as possible.

We claim:

1. Overload protector for static converters, characterized in that the protector comprises a current sensitive member arranged on the DC side of the converter and short-circuiting means on both the direct and the alternating current sides of the rectifier connection of the converter, said current sensitive member including means to close the short-circuiting means in response to a predetermined increase in direct current.

2. Overload protector for static converters according to claim 1, characterized in that the protector comprises circuit breaking means on the alternating current side of the converter, said current-sensitive member including means to open said circuit breaking means in response to said increase in the direct current.

3. Overload protector for static converters according to claim 1, for a number of series-connected converters each provided with short-circuiting means and having a common current-sensitive member, characterized in that said current-sensitive member includes means responsive to said increase in the direct current to short circuit the converters one at a time.